(12) United States Patent
Lewis

(10) Patent No.: US 7,689,857 B2
(45) Date of Patent: Mar. 30, 2010

(54) METHOD AND APPARATUS FOR MONITORING AND MAINTAINING USER-PERCEIVED QUALITY OF SERVICE IN A COMMUNICATIONS NETWORK

(75) Inventor: Lundy M. Lewis, Mason, NH (US)

(73) Assignee: Computer Associates Think, Inc., Islandia, NY (US)

( * ) Notice: Subject to any disclaimer, the term of this patent is extended or adjusted under 35 U.S.C. 154(b) by 1059 days.

(21) Appl. No.: 10/332,752

(22) PCT Filed: Jul. 13, 2001

(86) PCT No.: PCT/US01/22108

§ 371 (c)(1),
(2), (4) Date: Jun. 19, 2003

(87) PCT Pub. No.: WO02/06972

PCT Pub. Date: Jan. 24, 2002

(65) Prior Publication Data

US 2004/0078733 A1     Apr. 22, 2004

Related U.S. Application Data

(60) Provisional application No. 60/217,972, filed on Jul. 13, 2000.

(51) Int. Cl.
*G06F 11/00* (2006.01)
(52) U.S. Cl. .................. 714/4; 714/18; 714/27; 714/47; 714/48; 370/229; 370/235; 370/252
(58) Field of Classification Search ............ 714/31, 714/43, 74, 18, 4, 47–48, 27; 710/52–57; 370/229, 235, 252
See application file for complete search history.

(56) References Cited

U.S. PATENT DOCUMENTS 4,628,327 A * 12/1986 Anderson et al. ...... 346/33 ME (Continued)

OTHER PUBLICATIONS

Managing Business and Service Networks (Kluwer/Plenum Publishers, 2001) Lundy Lewis. Chapter 6.

*Primary Examiner*—Scott Baderman
*Assistant Examiner*—Loan Truong
(74) *Attorney, Agent, or Firm*—Pillsbury Winthrop Shaw Pittman LLP

(57) ABSTRACT

A method and apparatus for managing data, voice, application, and video services allows anticipation of poor quality of service from a remote management station, in order to allow correction of the cause before the end user perceives service quality degradation. Specific system phenomena are identified that coincide with user-perceived service degradation in a particular network. The network is then monitored for the occurrence of those phenomena. Incipient or existing user-perceived quality of service degradation is inferred from the occurrence of one or more of those phenomena and action is taken to avoid and/or correct the degraded service quality condition. In a preferred embodiment, as many of the steps as possible are performed automatically by a network management system. In one embodiment, a close correlation is assumed between application data buffer over-extension and poor quality of service from a user's point of view. In this embodiment, a monitor is placed on the application data buffer that raises an alarm for a network management system whenever the buffer is close to over-extension or an algorithm identifies a trend towards over-extension.

28 Claims, 5 Drawing Sheets

U.S. PATENT DOCUMENTS

| | | | | |
|---|---|---|---|---|
| 4,707,796 A * | 11/1987 | Calabro et al. | | 702/34 |
| 4,860,360 A * | 8/1989 | Boggs | | 704/233 |
| 5,020,007 A * | 5/1991 | Wu et al. | | 702/34 |
| 5,239,468 A * | 8/1993 | Sewersky et al. | | 701/35 |
| 5,347,646 A * | 9/1994 | Hirosawa et al. | | 714/49 |
| 5,508,941 A * | 4/1996 | Leplingard et al. | | 709/224 |
| 5,687,348 A * | 11/1997 | Whittaker | | 711/133 |
| 5,691,975 A * | 11/1997 | Hamada et al. | | 370/232 |
| 5,799,154 A * | 8/1998 | Kuriyan | | 709/223 |
| 5,892,754 A * | 4/1999 | Kompella et al. | | 370/236 |
| 5,964,891 A * | 10/1999 | Caswell et al. | | 714/31 |
| 6,006,016 A * | 12/1999 | Faigon et al. | | 714/48 |
| 6,012,152 A * | 1/2000 | Douik et al. | | 714/26 |
| 6,021,457 A * | 2/2000 | Archer et al. | | 710/260 |
| 6,101,547 A * | 8/2000 | Mukherjee et al. | | 709/231 |
| 6,107,918 A * | 8/2000 | Klein et al. | | 340/511 |
| 6,148,335 A * | 11/2000 | Haggard et al. | | 709/224 |
| 6,154,778 A * | 11/2000 | Koistinen et al. | | 709/228 |
| 6,192,325 B1 * | 2/2001 | Piety et al. | | 702/184 |
| 6,195,697 B1 * | 2/2001 | Bowman-Amuah | | 709/224 |
| 6,253,339 B1 * | 6/2001 | Tse et al. | | 714/47 |
| 6,412,045 B1 * | 6/2002 | DeKoning et al. | | 711/135 |
| 6,434,512 B1 * | 8/2002 | Discenzo | | 702/184 |
| 6,446,123 B1 * | 9/2002 | Ballantine et al. | | 709/224 |
| 6,452,925 B1 * | 9/2002 | Sistanizadeh et al. | | 370/352 |
| 6,487,457 B1 * | 11/2002 | Hull et al. | | 700/17 |
| 6,493,837 B1 * | 12/2002 | Pang et al. | | 714/45 |
| 6,505,253 B1 * | 1/2003 | Chiu et al. | | 709/235 |
| 6,539,427 B1 * | 3/2003 | Natarajan et al. | | 709/224 |
| 6,571,285 B1 * | 5/2003 | Groath et al. | | 709/223 |
| 6,651,190 B1 * | 11/2003 | Worley et al. | | 714/43 |
| 6,738,811 B1 * | 5/2004 | Liang | | 709/224 |
| 6,744,767 B1 * | 6/2004 | Chiu et al. | | 370/395.21 |
| 6,763,390 B1 * | 7/2004 | Kovacevic et al. | | 709/231 |
| 6,765,873 B1 * | 7/2004 | Fichou et al. | | 370/235 |
| 6,789,182 B1 * | 9/2004 | Brothers et al. | | 712/30 |
| 6,798,745 B1 * | 9/2004 | Feinberg | | 370/235 |
| 6,801,501 B1 * | 10/2004 | Knightly et al. | | 370/233 |
| 6,802,020 B1 * | 10/2004 | Smith | | 714/4 |
| 6,826,434 B1 * | 11/2004 | Chang | | 700/86 |
| 6,868,080 B1 * | 3/2005 | Umansky et al. | | 370/354 |
| 6,918,059 B1 * | 7/2005 | Galuten et al. | | 714/31 |
| 6,985,901 B1 * | 1/2006 | Sachse et al. | | 707/10 |
| 6,990,591 B1 * | 1/2006 | Pearson | | 726/22 |
| 7,065,566 B2 * | 6/2006 | Menard et al. | | 709/223 |
| 7,307,954 B1 * | 12/2007 | Strandberg et al. | | 370/235 |
| 7,426,471 B1 * | 9/2008 | Briscoe et al. | | 705/1 |
| 2001/0001851 A1 * | 5/2001 | Piety et al. | | 702/184 |
| 2002/0091802 A1 * | 7/2002 | Paul et al. | | 709/220 |
| 2002/0129134 A1 * | 9/2002 | Leighton et al. | | 709/223 |
| 2002/0169614 A1 * | 11/2002 | Fitzpatrick et al. | | 704/270.1 |
| 2004/0028274 A1 * | 2/2004 | Kawakami et al. | | 382/187 |
| 2005/0021813 A1 * | 1/2005 | Kovacevic et al. | | 709/231 |

* cited by examiner

METHOD AND APPARATUS FOR MONITORING AND MAINTAINING USER-PERCEIVED QUALITY OF SERVICE IN A COMMUNICATIONS NETWORK

RELATED APPLICATIONS

This application claims priority to U.S. Provisional Application Ser. No. 60/217,972, filed Jul. 13, 2000.

FIELD OF THE INVENTION

The invention relates to management of communications networks and, in particular, to anticipation and avoidance of user-perceived service quality degradation.

BACKGROUND

Typically, managers of communications networks exist far away from network services as experienced by end users. It is therefore difficult for these remotely situated managers to know when the quality of service, as perceived by the users, is unacceptable. Currently, a user usually must call a help desk if the quality of service becomes unacceptable. Consequently, user work is interrupted and the achievement of the purpose of the service may be degraded or even halted for lengthy periods of time.

OBJECTS OF THE INVENTION

The object of the present invention is to provide a method and apparatus by which to allow, from a remote management station, anticipation of the onset of poor quality of video, voice, application, or data services in order allow correction of the cause or causes before the end user perceives a degradation in service quality.

SUMMARY

In the present invention, specific system phenomena are identified that coincide with user-perceived Quality of Service (QoS) degradation in a particular network and associated systems. Once one or more specific correlating phenomena are identified, one or more monitors for use in detecting the occurrence of the phenomena are selected and/or built. Each monitor is then installed at an appropriate place in the network or in a system application, in order to allow detection of any occurrences of the correlating phenomenon. The network is then monitored for the occurrence of those phenomena and incipient or existing user-perceived QoS degradation is inferred from an occurrence. When an occurrence is detected, an alarm is raised for the network manager's attention. Action can then be taken to avoid and/or correct the degraded service quality condition. In the preferred embodiment of the invention, as many of the steps as possible are performed automatically, preferably by a network management system.

One embodiment of the invention utilizes the close correlation between application data buffer over-extension and user-perceived poor quality of service. In this embodiment, the fullness of the application data buffer is monitored and an alarm is raised in a network management system whenever the buffer is close to over-extension or an algorithm identifies a trend towards over-extension.

DETAILED DESCRIPTION

With today's complex communications services involving video, data, and voice, there is evidence that an end user's perception of degraded quality of service (QoS) frequently coincides with specific, detectable, system phenomena. Such phenomena can include such things as CPU overload, near depletion of internal or external data stores, slow screen refreshing, and data buffer re-flushing. While it is not always clear whether these phenomena, either alone or in concert, are the cause of degraded service quality, are symptoms of the problem, or simply happen to generally coincide with degraded service quality conditions, their presence can still be utilized by network managers to anticipate and then avoid lengthy periods of degraded service quality.

The present invention involves identifying specific system phenomena that are related to user-perceived QoS degradation in a particular communications network and associated systems, monitoring that network and associated systems for the occurrence of those phenomena, inferring incipient or existing user-perceived QoS degradation from the occurrence of one or more of those phenomena, and taking action to avoid and/or correct a degraded service quality condition. In the preferred embodiment of the invention, as many of the steps as possible are performed automatically, e.g., once specific service quality degradation-related phenomena are identified, the network and associated systems are automatically monitored for their occurrence via a network management system and, when occurrences are detected, the corrective actions are automatically initiated by a network management system or other management apparatus, such as an element management system or a management agent.

The advantages of the invention over what has been done previously include providing the ability to infer the end user's perceived quality of service from remote management stations without user action, as well as to anticipate and prevent degradation of user-perceived quality of service. Collecting variables constituting the state of a network and associated systems over time allows the use of machine learning algorithms to discover subtle causes of poor quality; such discoveries can then be used to increase the efficiency of the network.

Figure 1:
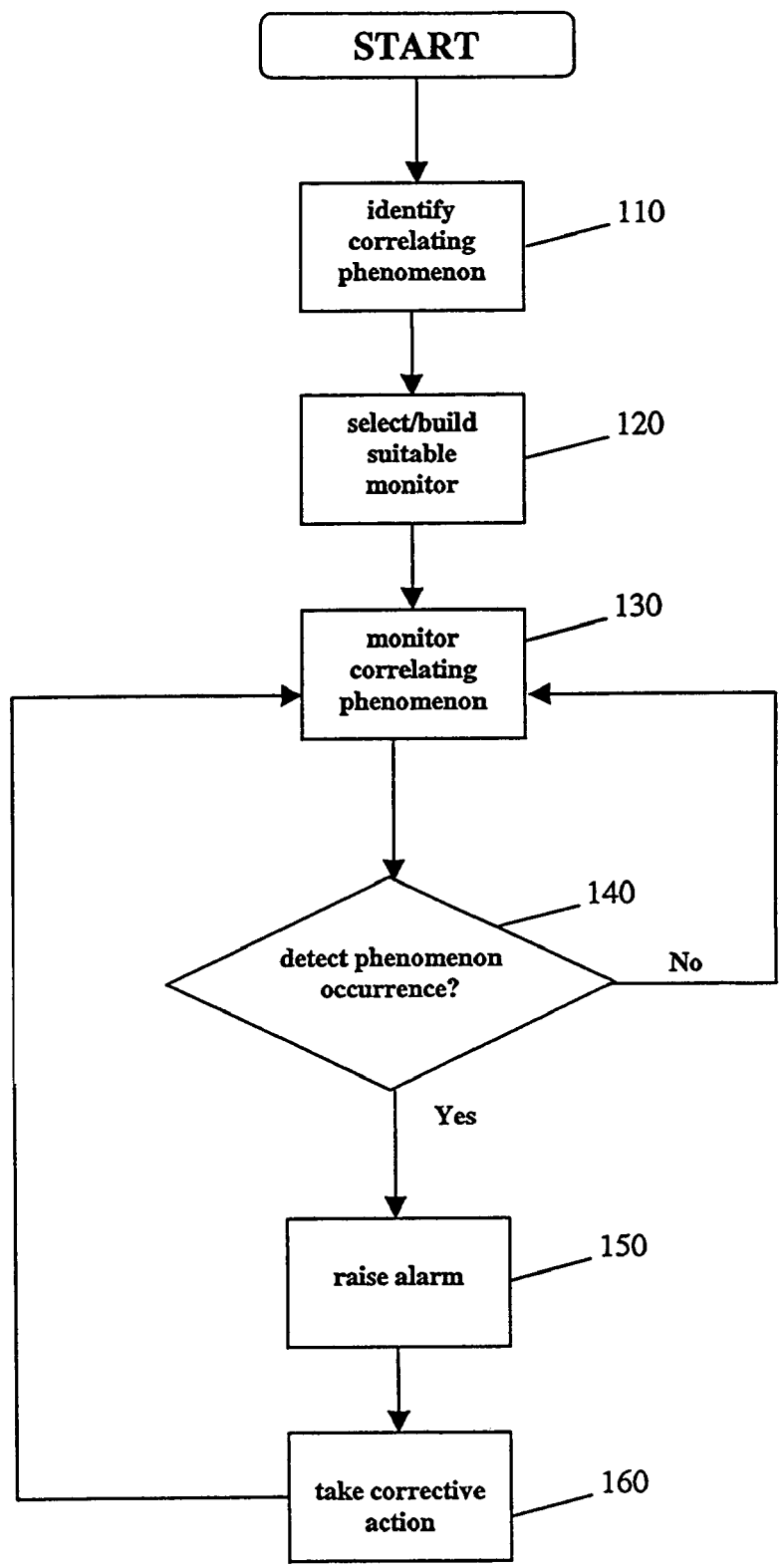
FIG. 1 illustrates the operation of an embodiment of the method for monitoring and maintaining Quality of Service of the present invention.

An operational flowchart of the invention is shown in FIG. 1. In FIG. 1, specific network phenomena that correlate with periods of degraded user-perceived Quality of Service are identified 110. In the preferred embodiment, a network management system (NMS) is used to gather data on system parameters and on occurrences of user-perceived QoS. The identification of specific system phenomena that coincide with periods of user-perceived QoS degradation may be made through any number of methods known in the art including, but not limited to, statistical correlation, data mining algorithms, machine learning algorithms, reversing engineering application code or designs, and empirical observation. In the preferred embodiment, an NMS provides the correlation function, preferably being the same NMS used to gather the data on which the correlation is performed.

Once one or more specific system phenomena related to user-perceived degraded QoS are identified 110, one or more monitors for use in detecting the occurrence of one or more of the phenomena are selected and/or built 120. Such monitors may include network management systems, management agents, element management systems or any of the many other monitoring systems and devices known in the art. Monitoring of variables is accomplished through polling or traps, where the variables monitored may include buffer overflows, CPU overload, capacity of internal and external data stores, inferences from a collection number of such variables, or any of the many other types of monitorable parameters known in the art. Each selected monitor is then installed in an appropriate place on the network or system applications, in order to allow detection of any occurrences of the correlating phenomenon or phenomena 130. It is to be understood that the appropriate venue for the monitor depends on exactly what system phenomenon is being monitored and how.

When an occurrence of one of the correlating phenomena is detected 140, an alarm is raised 150 for the network manager's attention. In the preferred embodiment, each monitor and/or variable is automatically monitored by a network management system in order to facilitate the raising of alarms and taking of corrective actions. However, monitoring can of course be handled by any of the many methods known in the art. In the preferred embodiment, the alarm is also raised automatically, again preferably by a network management system. Alarms may be raised by any of the many methods known in the art including, but not limited to, sending the alarm to a pager, a telephone, a network management system, to an element management system, or to any other compatible system. Once the alarm is raised 150, corrective action is taken 160. In the preferred embodiment, this is also done automatically by a network management system, but it may alternatively be accomplished manually or by any of the other methods known in the art.

Figure 2:
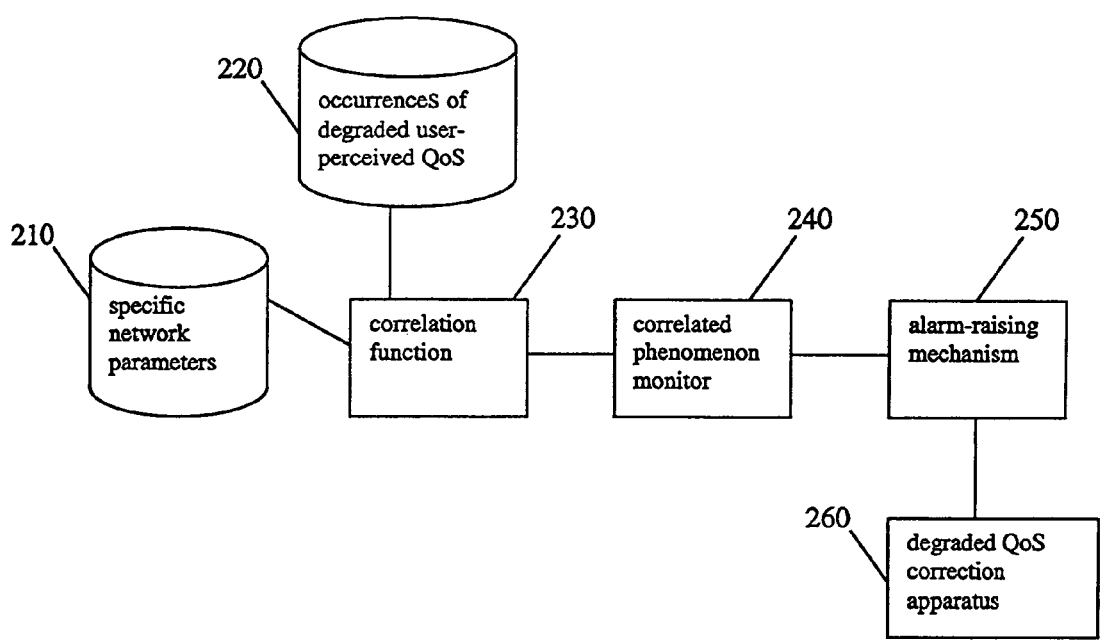
FIG. 2 is a block diagram of an embodiment of an apparatus for monitoring and maintaining Quality of Service according to the present invention.

A block diagram of a system implementing the invention is shown in FIG. 2. As shown in FIG. 2, measurable network parameters and events 210 are compared to occurrences of user-perceived service degradation 220 by use of some form of correlation method 230. Any of the many correlation methods known in the art are suitable. In a preferred embodiment, the network parameters 210 and occurrences of degraded user-perceived QoS 220 are collected by a network management system that is then used to perform correlation 230.

Once a correlated phenomenon is identified through use of correlation method 230, occurrences of the phenomenon are monitored with phenomenon monitor 240. In the preferred embodiment, this is also handled within a network manager. When an occurrence of the correlated phenomenon is observed by the monitor 240, an alarm is raised by alarm-raising mechanism 250 and corrective action is taken by correction apparatus 260. In the preferred embodiment, alarm-raising mechanism 250 and correction apparatus 260 are again part of a network management system.

An example embodiment of the invention takes advantage of a system application phenomenon that has been observed to be related to user-perceived QoS degradation and is known as "data buffer re-flushing.". In some systems, if a data buffer becomes over-extended (i.e. filled beyond its designated size), the buffer is flushed and begins to fill in again. This phenomenon has been observed to coincide with flicks, specks, and irritating delays in the service (be it a voice, video, application, or data service).

Figure 3:
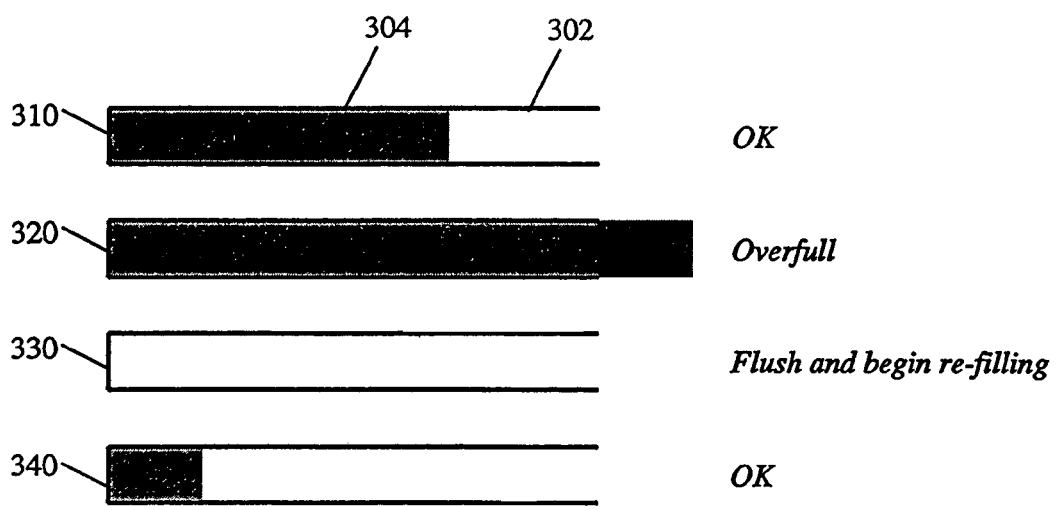
FIG. 3 illustrates the temporal sequence of the application data buffer re-flushing phenomenon.

FIG. 3 illustrates the temporal sequence involved in application data buffer re-flushing. In FIG. 3, a data buffer is represented by an open-ended rectangle 302. The shaded area 304 represents the portion of the buffer that is filled with data. Initially, the data buffer is only partially filled 310. As use of the application continues, the buffer becomes overfull 320. The buffer is then flushed 330 and begins to refill 340.

In an embodiment of the present invention that makes use of the apparent correlation between data buffer re-flushing and service quality degradation, a monitor is placed on the application data buffer in order that an alarm may be raised in a network management platform when (or just before) the data buffer is over-extended or an algorithm identifies a trend towards over-extension. In the preferred embodiment, the monitored variable would be a MIB variable (e.g. SNMP, CMIP, CORBA), but it could also be a variable provided by a proprietary protocol or any other monitoring protocol. The monitor value at which an alarm is sent to the management system may be determined by a simple threshold function, a trending function, a fuzzy logic function, or any other appropriate function known in the art. The alarm may then be sent to a pager, a telephone, a network management system, an element management system, or to any other compatible system.

An example of a networking scenario in which this particular embodiment is may be applied is the distance learning application. One distance learning application that has recently been studied for application of the present invention is part of the North Carolina Network Initiative (NCNI). The NCNI participates in the "Internet2 Project", which refers to joint work among universities, industry, and federal agencies towards advancing Internet applications into spaces such as tele-medicine, remote laboratory work, and distance education.

At the core of the Internet2 design is a new technology referred to as a Gigabit Point of Presence (GigaPoP). Given advances in fiber optic technology, the Internet backbone has become a more or less limitless, reliable medium for moving large volumes of traffic from one geographical area to another. A GigaPoP is the point of interconnection and service delivery between the institutional members of the Internet2 project and one or more Internet service providers. GigaPoPs are essentially the on/off ramps between the Internet backbone and commercial businesses, university campuses, and government agencies. Thus, the GigaPoP is an intermediary network that regulates traffic between the Internet backbone and those other networks The rationale for GigaPoP development is: Important as a very high-performance backbone is to the next generation of Internet applications, it is no less important that the points at which people connect to the backbone, the so-called Points of Presence (PoPs), provide an equivalent level of performance. The Quality of Service of an Internet application, from the desktop, across the Internet, and back again, is only as good as the weakest link in the application provision process. The requirement, then, is to build and manage a network that can serve as a PoP for handling the multi-gigabit traffic to be delivered by the next-generation Internet. The GigaPoP is a central distribution point where large amounts of digital traffic are moved between various end points and the main line. Since there will be diverse kinds of applications that are downstream from the GigaPoP, each with special bandwidth and priority requirements, it is important that the GigaPoP be able to regulate and prioritize traffic accordingly.

The Internet2 design calls for GigaPoPs that support several crucial features. Each GigaPoP must have high capacity (at least 622 Mb/s) and high reliability and availability. It must use the Internet Protocol (IP) as a bearer service, and must be able to support emerging protocols and applications. It must be capable of serving simultaneously as a workaday environment and as a research test bed. It must allow for traffic measurement and data gathering. Lastly, it must permit migration to differentiated services and application-aware networking.

NCNI built an intermediate GigaPoP network between the Internet2 backbone and the research community, with the goal of resolving bottlenecks in the community Internet typically caused by high traffic demands of distributed applications. The North Carolina GigaPoP is considered one of several frontrunners in terms of research and development. Advanced applications such as distance education and remote laboratory work impose special requirements for managing the NC GigaPoP. The goals of the NC GigaPOP are (i) to keep local traffic local, (ii) to provide optimized access to research and education applications that depend upon the Internet and, most importantly, (iii) to insure an acceptable quality of service for all local and Internet-driven applications, such as the distance learning application.

Figure 4:
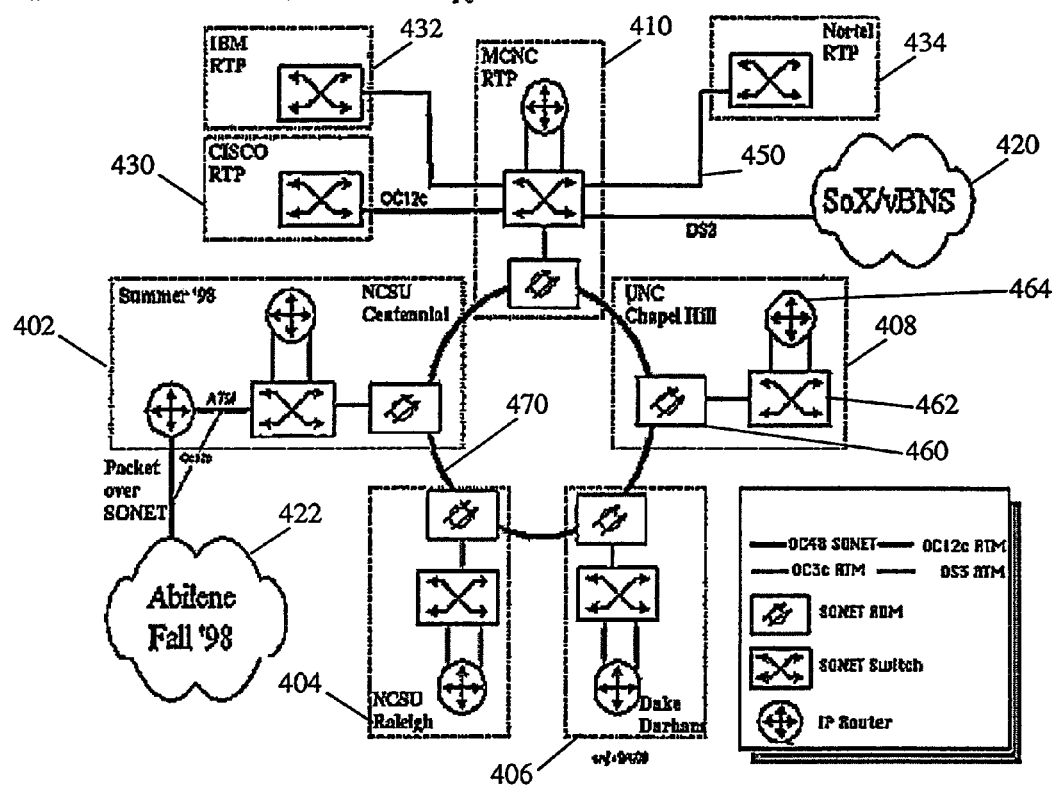
FIG. 4 is a diagram of an illustrative network with which an embodiment of the present invention may be used.

FIG. 4 shows the overall topology of the NC GigaPoP. A GigaPoP is much like any other network, consisting of a collection of nodes. A node is a geographic location where various GigaPoP devices reside. As shown in FIG. 4, there are five primary nodes: North Carolina State University (NCSU) Centennial campus 402, NCSU Raleigh campus 404, Duke University 406, University of North Carolina at Chapel Hill 408, and MCNC 410. These primary nodes perform core routing and operational functions for the GigaPOP. They also serve as connection points (on-ramps) to national networks, including the vBNS 420 and the Abilene network 422. Equipment at primary node sites includes optical-fiber terminating equipment 460, virtual-circuit SONET switches 462, data routers 464, and network monitoring devices. Primary nodes are connected by OC48 SONET optical links 460. Secondary nodes reside at NCNI industry sites located in the RTP area, including Cisco Systems 430, IBM 432, and Nortel Networks 434. These secondary nodes are connected to the primary nodes via tributary optical-fiber links 450. The NC GigaPoP is an intermediary network—the campus networks at NC State, Duke, and UNC at Chapel Hill are outside the scope of the GigaPoP but are connected to it The North Carolina Research and Education Network (NCREN) distance learning application was selected for experiments. Thus, the experiments focused specifically on those GigaPoP devices that support distance learning in North Carolina In particular, the NC GigaPoP includes Litton Corporation CAMVision-2 Codec (CV2) video applications running on instructors' and students' NT workstations. CAMVision management is therefore required in order to achieve (i) end-to-end management of the distance learning service and (ii) stronger event correlation and fault isolation over the complete set of elements that supports the distance learning service. It is equally clear that the quality and proactivity of CAMVision management has a great effect on the quality of service perceived by users of the distance learning facility.

For this study, mapping of the network was limited to those Universities that were participating in the distance learning trials. The core router elements were added to the network management system being used, Aprisma Management Technologies' Spectrum®, using the "model by IP" method. Spectrum retrieved MIB information from the routers, collected interface identifications and IP addresses, and discovered the logical and physical connections between the routers.

However, the end-to-end management of NC's distance learning application required some additional customization. While Spectrum has management modules for other physical and logical NCREN objects, it was found to be necessary to develop a model in Spectrum that represents CV2s and communicates with them via SNMP. It was determined that Litton's CAMVision (CV2) product runs on an NT workstation as an NT application; the Litton CV2 SNMP MIB piggybacks on the standard NT MIB. CV2, then, is basically an application that runs on an NT box. In Spectrum there is a standard NT management module that provides the means to import additional NT application MIBs. This may be accomplished with the Spectrum level-1 Toolkit, which means that it can be done on site, with no additional programming. Once the CV2/NT module is in place, each CV2 may be modeled for purposes of monitoring and control.

A correlation was performed between unexplained anomalies in the distance learning service and the state of the NC GigaPoP as a whole, and an investigation was undertaken to determine whether such knowledge could be used to answer the question: Can the network accommodate a particular new CAMVision video session and still meet the ultimate goal of proactive management of user-perceived QoS? An investigation was also undertaken to determine the extent to which the information that could be acquired from CV2/NT was useful for management purposes. For example, were there CV2 MIB variables whose values indicate poor video quality? If so, then that would provide the means for an engineer to receive an alarm or page whenever poor video quality occurs or is about to occur. Further, historical data were analyzed to infer conditions that typically coincide with poor video performance, including any recommendations for correction or possibly automated correction of the poor performance condition.

It was discovered that the only feedback regarding video quality that is available at the application layer is the CV2 restart mechanism. That is, when the data buffers in a CV2 application are well beyond the full mark, the method of recovery is to flush the buffer and restart the sending stream. There was no trap in the CV2 MIB that allowed detection of an imminent restart condition. The insertion of a restart trap into the CV2 MIB is therefore useful for management purposes, allowing full implementation of the present invention.

The hypothesis used for this embodiment of the present invention was, therefore, that the restart variable is the index into poor video quality; i.e. it correlates with poor quality of service from the user's point of view. User-perceived quality of service can therefore be inferred from a simple application MIB variable—the buffer restart variable. The restart variable in fact proved to be a good index into quality of service from the user's point of view.

Enhancements were made to Spectrum in order to allow it to predict when an anomaly was about to happen and to then take action to prevent it. The Spectrum Alarm Manager provides various useful functions for the implementation of the present invention, including automated popup when an alarm occurs and the ability to capture notes, probable causes, and other related data when acknowledging an alarm. Actually setting alarm thresholds and threshold formulas is largely straightforward using methods commonly known in the art. The more difficult task is deciding at what level to set particular thresholds and developing advanced threshold formulas in the first place. This may be accomplished using any of a number of methods known in the art, including, but not limited to empirical experimentation, reverse engineering of application code or design, machine learning and statistical algorithms, and datamining. Spectrum was therefore set to raise an alarm at a prespecified threshold—for example, when the buffer restart variable is reset twice in less than a minute.

Figure 5:
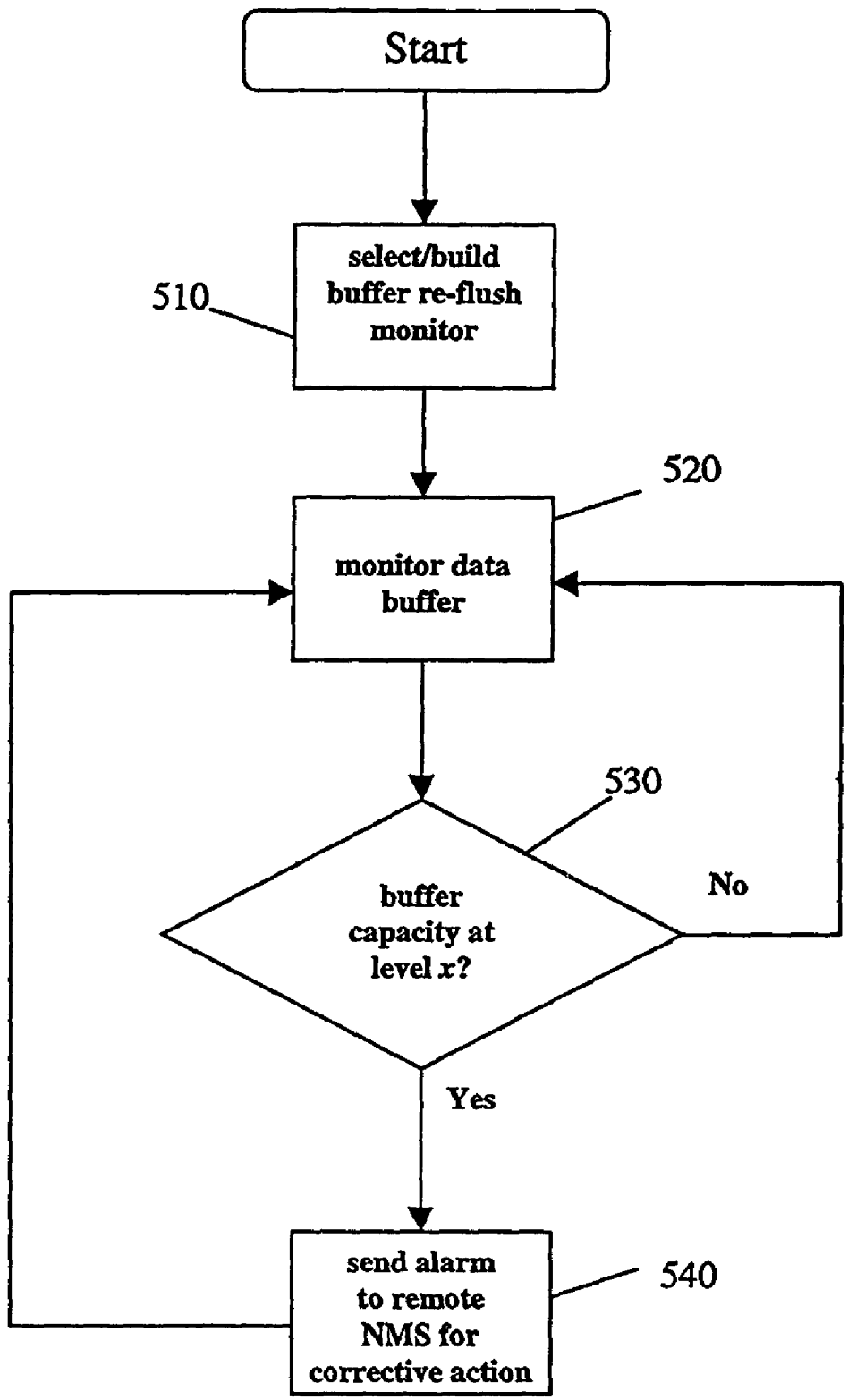
FIG. 5 illustrates the operation of an embodiment of the method of the present invention utilizing an application data buffer re-flushing monitor.

The operation of this embodiment of the present invention, utilizing a buffer re-flush restart monitor, is depicted in FIG. 5. In FIG. 5, a buffer re-flush monitor is built 510 by creating a variable in the CV2 MIB that reflects the fullness of the video data buffers. This variable is monitored 520, and when it exceeds a prespecified threshold 530, an alarm is sent 540 to a remote network manager for corrective action.

The ultimate goal of the application of the example embodiment of the present invention to the distance learning service was to be able to predict poor video performance and correct it before it occurs. Utilizing the present invention as part of end-to-end management of the distance learning service, therefore, brings the distance learning application closer to the ultimate goal of proactive management of user-perceived Quality of Service. What has been described, however, is merely illustrative of the application of the principles of the present invention. Other arrangements, methods, modifications and substitutions by one of ordinary skill in the art are also considered to be within the scope of the present invention, which is not to be limited except by the claims that follow.

What is claimed is:

1. A method for preventing degraded quality of service at a user computer coupled to a communications network, comprising:

gathering a plurality of system parameters from a plurality of devices within the communications network, wherein the plurality of system parameters gathered from the plurality of devices within the communications network relate to one or more occurrences of degraded quality of service perceived by a user at the user computer;

identifying one or more system phenomena that occur within the communications network based on the plurality of system parameters gathered from the plurality of devices within the communications network, wherein the identified system phenomena coincide with the one or more occurrences of degraded quality of service previously perceived by the user at the user computer;

monitoring one or more of the plurality of system parameters on one or more of the plurality of devices within the communications network to detect a trend towards an occurrence of the identified system phenomena within the communications network, wherein one or more monitors installed in the communications network perform the monitoring remotely from the user computer;

inferring an impending onset of degraded quality of service at the user computer in response to the one or more monitors detecting the trend towards the occurrence of the identified system phenomena from the monitored system parameters; and raising an alarm in response to the one or more monitors detecting the trend towards the occurrence of the identified system phenomena from the monitored system parameters, wherein the alarm alerts a network management system of the inferred impending onset of degraded quality of service at the user computer, whereby the network management system can prevent the inferred impending onset of degraded quality of service from occurring at the user computer.

2. The method of claim 1, further comprising taking corrective action in response to the alarm that alerts the network management system of the inferred impending onset of degraded quality of service at the user computer, wherein the network management system automatically initiates the corrective action to prevent the inferred impending onset of degraded quality of service from occurring at the user computer.

3. The method of claim 1, wherein one or more of said identifying, monitoring, and raising are performed via the network management system.

4. The method of claim 2, wherein one or more of said identifying, monitoring, raising, and taking corrective action are performed via the network management system.

5. A method for preventing degraded quality of service at a user computer coupled to a communications network, comprising:

gathering a plurality of system parameters from a plurality of devices within the communications network, wherein the plurality of system parameters gathered from the plurality of devices within the communications network relate to one or more occurences of degraded quality of service perceived by a user at the user computer;

monitoring one or more of the plurality of system parameters on one or more of the plurality of devices within the communications network to detect a trend towards an occurrence of at least one application data buffer re-flush within the communications network, wherein one or more monitors installed in the communications network perform the monitoring remotely from the user computer, and wherein the application data buffer re-flush coincides with the one or more occurrences of degraded quality of service previously perceived by the user at the user computer based on the gathered data;

inferring an impending onset of degraded quality of service at the user computer in response to the one or more monitors detecting the trend towards the occurrence of the application data buffer re-flush from the monitored system parameters; and raising an alarm in response to the one or more monitors detecting the trend towards the occurrence of the application data buffer re-flush from the monitored system parameters, wherein the alarm alerts a network management system of the inferred impending onset of degraded quality of service at the user computer, whereby the network management system can prevent the inferred impending onset of degraded quality of service from occurring at the user computer.

6. The method of claim 5, further comprising taking corrective in response to the alarm that alerts the network management system of the inferred impending onset of degraded quality of service at the user computer, wherein the network management system automatically initiates the corrective action to prevent the inferred impending onset of degraded quality of service from occurring at the user computer.

7. The method of claim 5, wherein one or more of said monitoring, and raising are performed via the network management system.

8. The method of claim 6, wherein one or more of said monitoring, raising, and taking corrective action are performed via the network management system.

9. An apparatus for preventing degraded quality of service at a user computer coupled to a communcations network, comprising:

at least one monitor that monitors one or more system parameters on one or more devices within the communications network to detect a trend towards an occurrence of one or more system phenomena within the communications network, wherein the at least one monitor is installed within the communications network remotely from the user computer; and a network management system in communication with the at least one monitor, wherein the network management system comprises at least one processor configured to:

gather a plurality of system parameters that include at least the one or more monitored system parameters from a plurality of devices that include at least the one or more devices within the communications network, wherein the plurality of system parameters gathered from the plurality of devices within the communications network relate to one or more occurences of degraded quality of service perceived by a user at the user computer;

identify the one or more system phenomena that occur within the communications network based on the plurality of system parameters gathered from the plurality of devices within the communications network wherein the identified system phenomena coincide with the one or more occurrences of degraded quality of service previously perceived by the user at the user computer;

infer an impending onset of degraded quality of service at the user computer in response to the at least monitor detecting the trend towards the occurrence of the identified system phenomena from the monitored system parameters; and raise an alarm in response to the at least one monitor detecting the trend towards the occurrence of the identified system phenomena from the monitored system parameters, wherein the alarm alerts the network management system of the inferred impending onset of degraded quality of service at the user computer, whereby the network management system can prevent the inferred impending onset of degraded quality of service from occurring at the user computer.

10. The apparatus of claim 9, wherein the at least one processor is further configured to take corrective action in response to the alarm that alerts the network management system of the inferred impending onset of degraded quality of service at the user computer, wherein the network management system automatically initiates the corrective action to prevent the inferred impending onset of degraded quality of service from occurring at the user computer.

11. The apparatus of claim 10, wherein the alarm is sent to one or more of a pager, a telephone, the network management system, and an element management system.

12. The apparatus of claim 9, wherein the at least one monitor uses one or more of polling or traps to monitor the one or more system parameters on the one or more devices within the communications network.

13. The method of claim 1, wherein the one or more monitors use one or more of polling or traps to monitor the one or more system parameters on the one or more devices within the communications network.

14. The method of claim 1, wherein raising the alarm includes sending the alarm to one or more of a pager, a telephone, the network management system, or an element management system.

15. The method of claim 5, wherein the one or more monitors use one or more of polling or traps to monitor the one or more system parameters on the one or more devices within the communications network.

16. The method of claim 5, wherein raising the alarm includes sending the alarm to one or more of a pager, a telephone, the network management system, or an element management system.

17. The method of claim 1, wherein the monitored system parameters include at least one of a CPU processing load, a capacity of an internal or external data store, a screen refresh rate, or a fullness of at least one application data buffer on the one or more devices within the communications network.

18. The method of claim 5, wherein the monitored system parameters include a fullness of the application data buffer on the one or more devices within the communications network.

19. The apparatus of claim 9, wherein the monitored system parameters include at least one of a CPU processing load, a capacity of an internal or external data store, a screen refresh rate, or a fullness of at least one application data buffer on the one or more devices within the communications network.

20. The method of claim 1, wherein the network management system performs at least one of a statistical correlation, a data mining algorithm, a machine learning algorithm, reverse engineering, or empirical observation on the plurality of system parameters gathered from the plurality of devices within the communications network to identify the one or more system phenomena that coincide with the occurrences of degraded quality of service previously perceived by the user at the user computer.

21. The method of claim 5, wherein the network management system performs at least one of a statistical correlation, a data mining algorithm, a machine learning algorithm, reverse engineering, or empirical observation on the plurality of system parameters gathered from the plurality of devices within the communications network to identify the application data buffer re-flush that coincides with the occurrences of degraded quality of service previously perceived by the user at the user computer.

22. The apparatus of claim 9, wherein the at least one processor is further configured to perform at least one of a statistical correlation, a data mining algorithm, a machine learning algorithm, reverse engineering, or empirical observation on the plurality of system parameters gathered from the plurality of devices within the communications network to identify the one or more system phenomena that coincide with the occurrences of degraded quality of service previously perceived by the user at the user computer.

23. The method of claim 1, wherein the one or more monitors perform at least one of a trending function or a fuzzy logic function on the monitored system parameters to detect the trend towards the occurrence of the identified system phenomena.

24. The method of claim 5, wherein the one or more monitors perform at least one of a trending function or a fuzzy logic function on the monitored system parameters to detect the trend towards the occurrence of the identified system phenomena.

25. The apparatus of claim 9, wherein the at least one monitor performs at least one of a trending function or a fuzzy logic function on the monitored system parameters to detect the trend towards the occurrence of the identified system phenomena.

26. The method of claim 17, wherein the identified system phenomena include at least one of an overload of the CPU processing load, near depletion of the capacity of the internal or external data store, slowness of the screen refresh rate, or the fullness of the application data buffer being greater than a threshold.

27. The method of claim 18, wherein the identified system phenomena include the fullness of the application data buffer being greater than a threshold.

28. The apparatus of claim 19, wherein the identified system phenomena include at least one of an overload of the CPU processing load, near depletion of the capacity of the internal or external data store, slowness of the screen refresh rate, or the fullness of the application data buffer being greater than a threshold.

* * * * *